United States Patent [19]

Häkli et al.

[11] Patent Number: 4,893,571
[45] Date of Patent: Jan. 16, 1990

[54] METHOD AND DEVICE FOR PLANTING BALLED SEEDLINGS

[75] Inventors: Reijo Häkli, Iso-Vimmo; Leo Lehto; Esa Lehto, both of Köyliö, all of Finland

[73] Assignee: Lännen Tehtaat Oy, Finland

[21] Appl. No.: 224,328

[22] Filed: Jul. 26, 1988

[30] Foreign Application Priority Data

Nov. 2, 1987 [FI] Finland ................................. 874803

[51] Int. Cl.⁴ .............................................. A01C 11/02
[52] U.S. Cl. ..................................... 111/105; 209/688
[58] Field of Search ........................ 111/2, 3; 209/688; 198/692–693, 848

[56] References Cited

U.S. PATENT DOCUMENTS

| | | |
|---|---|---|
| 32388,035 | 6/1983 | Cayton ..................................... 111/2 |
| 3,923,332 | 12/1975 | Shirouza ................................. 111/2 |
| 4,106,415 | 8/1978 | Häkli . | 
| 4,307,827 | 12/1981 | Turunen ................................. 111/2 |
| 4,408,549 | 10/1983 | Qvarnström . | 
| 4,592,470 | 6/1986 | Mattei ................................. 209/688 |
| 4,653,632 | 3/1987 | Timmer ................................. 198/848 |
| 4,693,374 | 9/1987 | Dall'Osso ............................. 209/688 |

FOREIGN PATENT DOCUMENTS

| | | | |
|---|---|---|---|
| 1148031 | 6/1983 | Canada ..................................... 111/3 |
| 2560482 | 9/1985 | France ..................................... 111/3 |
| 2140261 | 11/1984 | United Kingdom . | |
| 2166634A | 5/1986 | United Kingdom . | |
| 8601975 | 4/1986 | World Int. Prop. O. ............... 111/2 |
| 8706791 | 11/1987 | World Int. Prop. O. ............... 111/2 |

Primary Examiner—Danton D. DeMille
Attorney, Agent, or Firm—Burns, Doane, Swecker & Mathis

[57] ABSTRACT

This invention relates to an automatic method for planting balled seedlings grown in container trays. According to this invention, the balled seedling (7) is removed from the container by taking hold of it from the top with a fork-like gripping element (16) and transferring it into the ground. For this, a gripping prong (16) which remains in position at the gripping stage and into which the seedling is pushed is used. The seedlings can be planted without breakage or problems and in the correct position.

11 Claims, 3 Drawing Sheets

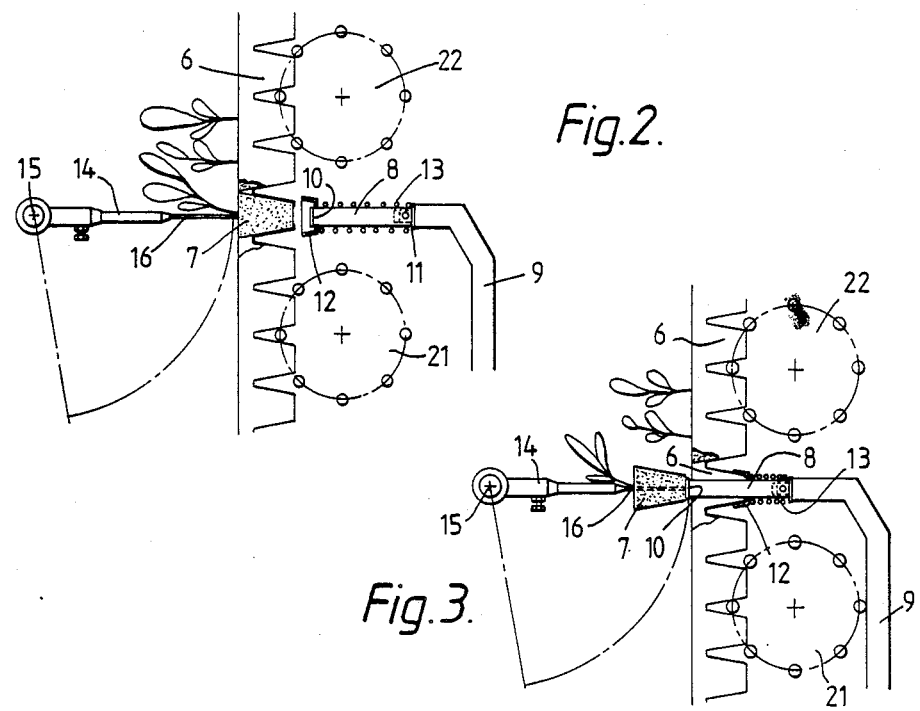
Fig. 2.
Fig. 3.
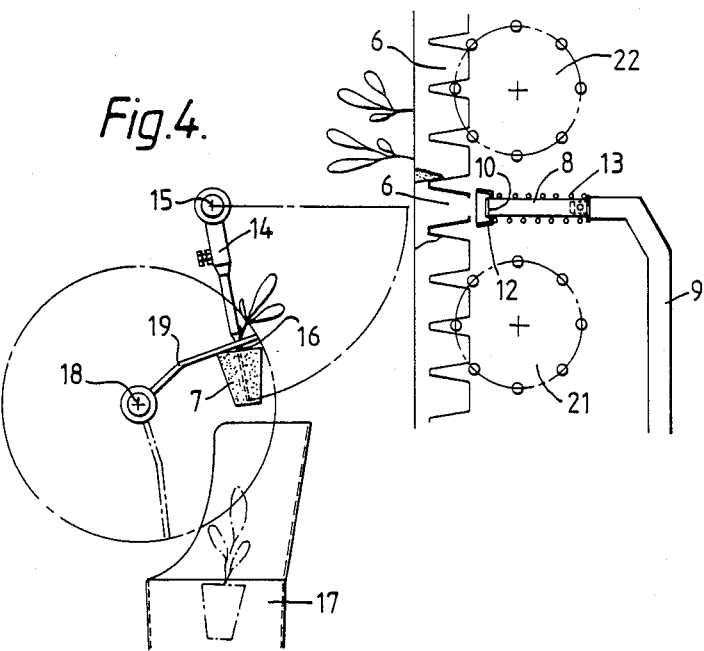
Fig. 4.

METHOD AND DEVICE FOR PLANTING BALLED SEEDLINGS

BACKGROUND OF THE INVENTION

This invention relates to an automatic method and device for planting balled seedlings grown in container trays.

A planting machine is presented in patent publication FR No. 2432265, capable of planting seedlings grown in containers with an open bottom. The containers are placed on edge with the container bottoms facing the front. The balled seedling is removed from the container by pushing it through the container mouth onto a horizontal planting table where it is taken hold of by special pliers. After this the planting table and pliers are turned down into a vertical position where the pliers open, dropping the seedling onto the ground.

The problem with the above device is its complex construction and unreliable operation. The pliers have to take hold of the seedling with considerable force at the acceleration stage in order to hold it securely. As a result, the pliers may easily break the balled seedling if the root system is not sufficiently developed to bind the ball with enough strength. Thick shoots may also cause feeding problems. At the point when the seedlings are being pushed out, thick shoots become entangled and tilt, with the result that the pliers fail to take hold of them or the seedlings drop onto the ground lopsided. On the other hand, the ascending pliers may knock the shoots and push the seedling out of the planting table.

The aim of this invention is to achieve a simple and reliable automatic planting device for planting balled seedlings direct from containers.

SUMMARY OF THE INVENTION

According to one aspect of the invention, the balled seedlings are removed from the tray through the top end of each container by means of gripping means comprising at least one spike or like, which is pushed into the ball from above. The means are preferably a fork comprising two spikes. The ball is preferably pushed though the bottom of the container to the gripping means which are steady during the pushing. After removing from the container, the ball is transferred to a release position, where the ball is removed from the gripping means and set into the ground. The ball is preferably removed from the gripping means by means of a release element. During the planting the tray is preferably on its edge, especially so that the tray faces sideways.

The trays used in the present invention preferably comprise of container spaced in rows at uniform distance. On the outside bottom of the tray there are grooves with same spacing as the container rows. The tray is then fed row by row through the level in which the seedling balls are taken out of the container. According to one aspect of the invention this is done by means of feeding means comprising a transfer roller the shaft of which is parallel to the container rows and on the circle of which there are rods having the same spacing as the container rows and fitting into the bottom grooves of the tray.

The trays preferably also comprise of parallel rows in which the containers are at uniform distance from one another. According to one aspect of the invention the tray is moved in a frame past a removing element in the direction of the row by means of a looped chain designed to travel parallel to the container rows over two gearwheels so that the distance between the two most extreme chain links on one length of chain from gearwheel to gearwheel is equal to the distance between the most extreme containers in a container row, one link of the said chain being provided with a sideways protruding pin. The frame has a groove into which the pin fits and in which it can travel perpendicular to the container row but not parallel to it.

The spike-like element to be pushed into the balled seedling according to this invention does not essentially produce the sort of stress that would break the ball. There is always some binding roots in the centre of the ball, which also prevents it from breaking when being set on the ground.

By using two prongs that penetrate the ball immediately after it is pushed out of the container, the ball cannot turn which means that it will always be in the right position.

BRIEF DESCRIPTION OF THE DRAWING

One embodiment of this invention is explained in detail below.

DETAILED DESCRIPTION OF A PREFERRED EMBODIMENT

Figure 1:
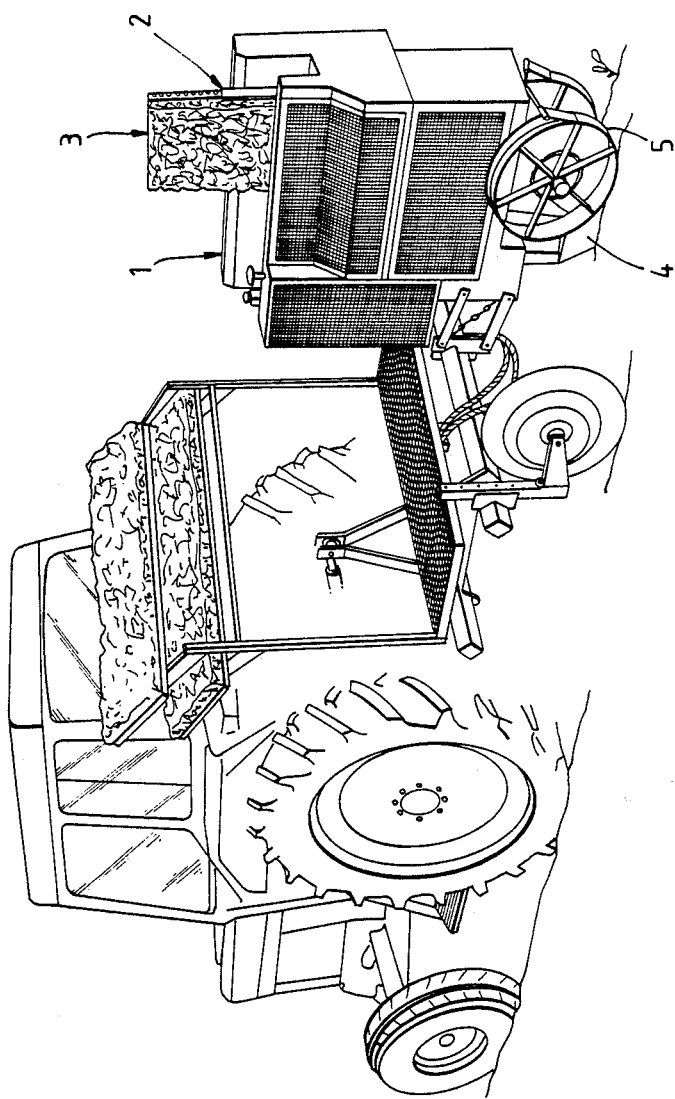
FIG. 1 shows the entire unit mounted onto a farm tractor while FIGS. 2, 3 and 4 give an illustration of the balled seedlings being removed from containers as seen from the rear.

The planting machine comprises a body 1 with a frame 2 for seedling container trays 3, a ploughshare 4 for cutting up the ground and packing wheels 5 for packing the earth around the planted seedlings. In addition, the device incorporates the equipment necessary for taking the seedlings out of the containers one by one and placing them in the furrow ploughed by the ploughshare. This equipment is described in detail below.

The tray is in the planting machine in a vertical position with the bottom of the tray facing sideways, or right as in FIG. 1. This permits the installation of several planting units side by side according to furrow spacing.

The device is coupled to the tractor's hitch and powered by its hydraulic system. Alternatively, power can be drawn from the supporting wheels of the body. At the front of the machine, there is room for the operator who feeds the container trays into the machine.

The tray used in this method is a rectangular matrix tray (FIG. 2) where the containers 6 are tapered towards the bottom and open at both ends.

The tray containing the seedlings to be planted is placed in the planter's vertical frame which moves so that each container 6 has to pass the planting elements.

The balled seedling 7 is removed from the container 6 by a push bar 8 which pushes it out from the bottom through the mouth. The push bar consists of the bent end of a lever rod 9.

The push bar 8 also comprises a device for centering it on the container bottom opening 6. The centering mechanism includes a collar 12, which is designed to glide along the push bar between an end flange 10 and a bearing flange 11 and to fit into the container bottom, and between the collar and the bearing flange there is a coil spring 13, which presses the collar against the end flange.

The edges of the collar protrude beyond the end of the push bar. When the bar moves towards the container bottom, the collar places itself tightly around the container, after which the bar hits the container bottom and is pushed inside it as the spring yields (FIG. 3), thus removing the seedling from the container.

To receive the seedling 7 pushed out of the container 6, the device is fitted with a transfer fork, the other end of which is mounted onto a horizontal bearing-supported shaft 15 located at the same height as the push bar 8 and in line with the plane of the tray, the other end of the said fork being fitted with two prongs 16 the tips of which are located on a straight line drawn from the transfer fork shaft. When the push bar pushes the seedling out of the container 6, the transfer fork is in a horizontal position and the seedling is affixed to the prongs. The prongs penetrate the ball in the centre on both sides of the actual seedling.

After the balled seedling 7 has been completely pushed out of the container 6 into the prongs 16, the transfer fork 14 turns down into a nearly vertical position, dropping the seedling into a planting tube 17 and then into the furrow (FIG. 4). After this the transfer fork returns to the horizontal position to receive the next balled seedling. Meanwhile, the push bar 8 returns to its initial position and the tray shifts so that a new container comes to meet the push bar.

At the lower end of the planting tube there are preferably elements to support and guide the seedling into the furrow. Such elements may consists of two rows of looped yarn walls which support the seedlings from the sides, with the yarns rising from the planting point directly upwards. This principle has been described in patent publication No. FI 65154, Lännen Tehtaat Oy, (corresponding to publication U.S. Pat. No. 4,106,415).

To ensure that the balled seedling 7 comes away from the prongs 16, there is a release element to push it away. This element consists a release fork 19 which is mounted on a bearing on a shaft 18 that is parallel to the transfer fork shaft 15, the tips of the said fork 19 being pressed against the seedling from the top on either side of the prongs at the moment when the seedling is to come away (FIG. 4). After separation the release fork rotates a full circle on its axis to be ready to detach the next seedling when it comes along. The tips of the release fork are slightly bent in its direction of rotation and the fork shaft is so positioned that it is a little higher than the top of the seedling at the moment when it is to be separated. The fork tips are made from a flexible material.

Figure 5:
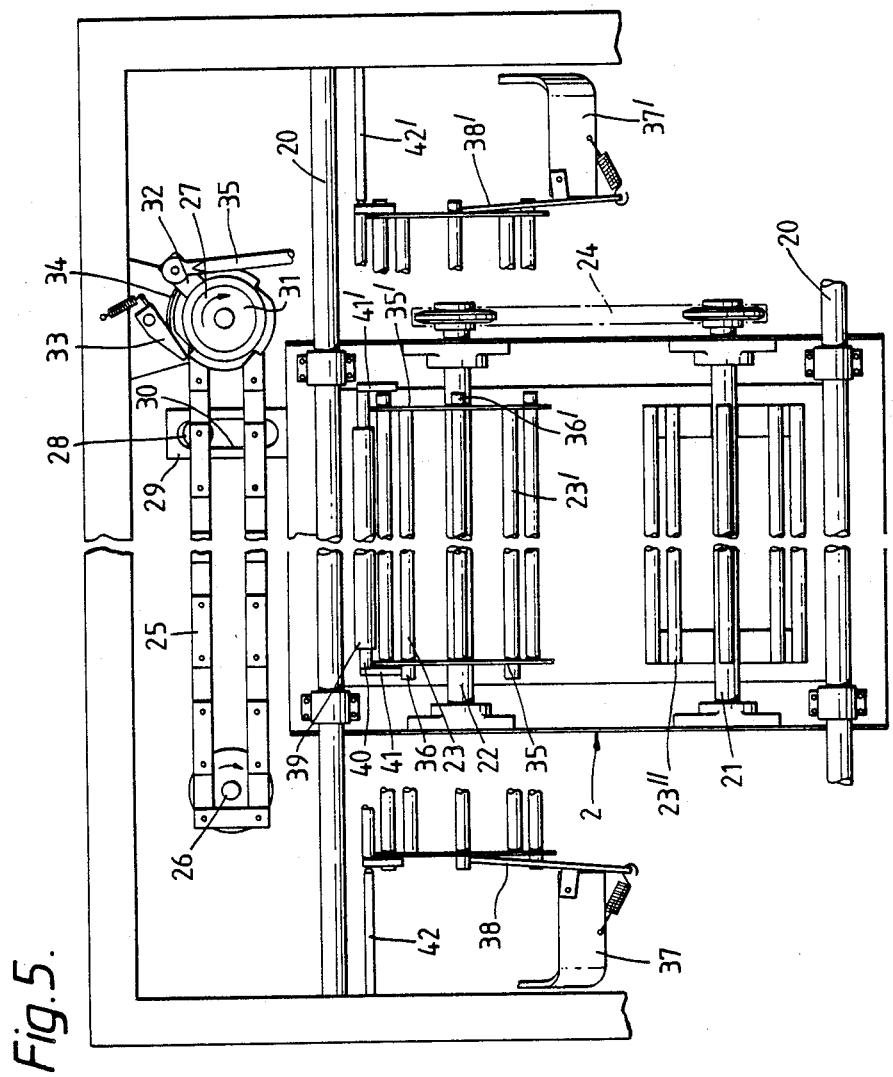
FIG. 5 is a schematic illustration of the transfer mechanism for the containers as seen from the side.

The frame 2 for the trays is designed to glide horizontally on tracks 20 (FIG. 5). Vertically, the tray is supported by two support rollers 21 and 22 placed on top of each other, with support rods 23, 23' and 23" being spaced along the surface of the said rollers to match the horizontal spacing of containers to support the tray from below between the horizontal rows of containers. When the tray needs to be moved downwards, the rollers are rotated one step at a time. The roller movements are synchronized by means of a chain 24.

Above the frame there is a looped drive chain 25 whose link spacing corresponds to horizontal container spacing and which is installed so that the two lengths of the chain are separated by a distance equal to one link. The drive chain is designed to rotate in the frame's direction of motion over gearwheels 26 and 27 which are placed so that the distance between the furthest links on one length of the chain is equal to the maximum lateral movement of the frame.

A bushing 28 is mounted onto one of the pins of the drive chain 25. At the upper section of the frame, there is a lug 29 and a groove 30, in which the bushing can move in the vertical direction. The chain is rotated step by step one link at a time, with the result that the frame and the tray travel the same distance. When the bushing reaches the end of its travel, the frame remains in position for one step as the bushing moves to the other end of the groove. At this point, the tray shifts one step down in the frame, after which the frame starts moving back towards the opposite end.

The movement of the drive chain is by means of a free wheel 31 connected to the gearwheel 27 and an arm 32 which moves back and forth. As the arm moves forward, the gearwheel turns 90°. By contrast, when the arm moves backwards, this movement is not transmitted to the gearwheel because of the free wheel. To prevent the gearwheel from turning backwards, its flange is provided with a latch 33, which is pressed into the grooves of the flange spaced at 90° intervals by the action of a spring. The arm 32 is fitted with a release pin 34 which, when the arm approaches its extreme back position, pushes the latch out of the groove, thus allowing the gearwheel to rotate until the latch is caught in the next groove. The arm 32 is actuated by means of a bearing-supported rod 35.

The necessary vertical movement of the tray is achieved by means of the upper support roller 22 and a transfer and locking mechanism that is coupled to the said roller. The supports 23 and 23' of the upper support roller are supported by flanges 35 and 35' so that the end 36 of every second support 23 protrudes beyond the left flange 35 and the end 36' of every second support 23' protrudes beyond the right flange 35'.

At both ends of the travel of the frame, there is a lever 37 which moves up and down and is provided with a latch 38. The latch 38 is positioned so that when the frame reaches its extreme position, the latch moves up and strikes the end 36 of the support located on the opposite side of the shaft of the roller 22, as seen from the tray, and rotates the roller one step upwards, with the result that the tray shifts one step down.

The frame also comprises a rod 40 which glides in a bushing 39 fixed at the roller 22, the said bushing being parallel to, and of the same length, as the support, the said rod 40 having transverse stoppers 40'/41' at both ends. The frame also comprises a spindle 42/42' to push the stoppers against the flange 36/36' when the frame reaches its extreme position. The stopper is so positioned that it fits into the support end 36/36', stopping it exactly where desired. When the frame moves to the opposite end of its travel, the stopper is released, allowing the roller to turn while the stopper at the opposite end ensures that it does not turn too much.

Naturally, all the machine elements are synchronized with one another.

In addition to conical containers, it is possible to use containers with straight walls. For this, grooves will have to be cut in the container tray wall for the support rods.

What is claimed is:

1. A method of planting balled seedlings taken from a container tray having a top and a bottom, wherein each balled seedling is taken hold of and removed from the container through the top, the improvement comprising taking hold of the balled seedling and removing it from the container by means of a spike-like element by pushing the seedling from the bottom into the spike-like element, which remains in a substantially horizontal position during the pushing operation, and subsequently releasing the seedling by rotating the spike-like element into a substantially vertical position.

2. Device for planting balled seedlings taken from a container tray having a top and a bottom, comprising a frame for receiving the tray on edge, a pivoted spike-like removing and gripping element for removing and taking hold of the seedling through the top, means for shifting the container tray within the device so that each of a plurality of individual containers is positioned opposite the removing and gripping element, means for pushing the seedling out of the container from the bottom, and means pivoting said removing and gripping element from essentially a horizontal position when the spike penetrates into the seedling to essentially a vertical position when the seedling is removed from the gripping element.

3. Device according to claim 3 comprising a release element for releasing the seedling from the removing and gripping element.

4. Device according to claim 3, wherein said release element is a push-action release element which presses the seedling from above away from the removing and gripping element.

5. Device according to claim 4, comprising a centering element attached to said element for pushing for ensuring that the pushing element centers exactly on the container bottom.

6. Device according to claim 2, in which the container tray comprises said individual containers aligned in rows at a uniform distance from one another and the container tray is provided with bottom grooves between and parallel to the container rows, said means for shifting the container tray comprising means for feeding the container tray, row by row, past said removing and gripping element, the feeding means comprising a transfer roller having a shaft parallel to the container rows about which are fitted rods that have the same spacing as the container rows and that fit into the bottom groves of the tray.

7. Device according to claim 2 in which the container tray comprises said individual containers aligned in rows at a uniform distance from one another, said means for shifting the container tray comprising moving means for moving the container tray, in the direction of the row, past said removing and gripping element so that all the individual containers are positioned opposite the removing and gripping element one by one, the moving means comprising a looped chain arranged parallel to the container rows over two gearwheels so that the distance between two most extreme chain links on one length of the chain from gearwheel to gearwheel is substantially equal to the distance between the most extreme individual containers in a container row, one link of the chain being provided with a sideways protruding pin, the pin fitting into a groove in the frame perpendicular to a container row.

8. Device according to claim 2 wherein said spike-like gripping element is two-pronged.

9. Device according to claim 2 wherein said push-action release element is a release fork.

10. Device for planting seedlings taken from a container tray comprising individual containers aligned in rows at a uniform distance from one another and the container tray provided with bottom grooves parallel to and with the same spacing as the container rows, the device comprising means for feeding the container tray, row by row, past a removing position, the feeding means comprising a transfer roller having a rotating shaft parallel to the container rows and fitted about the shaft are rods that have the same spacing as the container rows and that fit into the bottom grooves of the tray.

11. Device for planting seedlings taken from a container tray comprising individual containers aligned in rows at a uniform distance from one another, the device comprising a frame and moving means for moving the container tray, in the direction of the row, past a removing element so that all the individual containers are positioned opposite the removing element one by one, the moving means comprising a looped chain arranged parallel to the container rows over two gearwheels so that the distance between two most extreme chain links on one length of the chain from gearwheel to gearwheel is substantially equal to the distance between the most extreme individual containers in a container row, one link of the said chain being provided with a sideways protruding pin, the pin fitting into a groove in the frame perpendicular to the container row.

* * * * *